United States Patent [19]

Nakasaki et al.

[11] Patent Number: 5,069,262
[45] Date of Patent: Dec. 3, 1991

[54] MOTORCYCLE TIRE WITH NON-ZERO DEGREE BAND RADIALLY OUTWARD OF THE BREAKER

[75] Inventors: Eiji Nakasaki, Kakogawa; Hisashi Shirashoji; Katsuyuki Hoshikawa, both of Kobe; Takao Kamijo, Toyonaka; Kazushige Ikeda, Akashi; Yasuhiro Inoue, Himeji; Takeo Kato, Nishinomiya, all of Japan

[73] Assignee: Rubber Industries, Ltd., Kobe, Japan

[21] Appl. No.: 391,702

[22] Filed: Aug. 7, 1989

Related U.S. Application Data

[63] Continuation of Ser. No. 52,210, May 19, 1987, abandoned, which is a continuation of Ser. No. 720,240, Apr. 5, 1985, abandoned.

[30] Foreign Application Priority Data

Apr. 6, 1984 [JP] Japan .................................. 59-69550

[51] Int. Cl.$^5$ .............................................. B60C 9/28
[52] U.S. Cl. .................... 152/536; 152/538; 152/555
[58] Field of Search ............... 152/209, 454, 555, 526, 152/527, 529, 531, 536, 538, 534, 535, 541, 546, 552–554, 557, 558, 560, 561, 564

[56] References Cited

U.S. PATENT DOCUMENTS

| | | | |
|---|---|---|---|
| 3,786,851 | 1/1974 | Mirtain | 152/536 X |
| 3,874,436 | 4/1975 | Hashida et al. | 152/536 X |
| 4,086,949 | 5/1978 | Uy | 152/565 |
| 4,231,409 | 11/1980 | Mezzanotte | 152/536 X |
| 4,319,619 | 3/1982 | Kozima et al. | 152/564 X |
| 4,510,983 | 4/1985 | Ohkuni et al. | 152/209 R X |
| 4,706,724 | 11/1987 | Ohkuni et al. | 152/527 X |

FOREIGN PATENT DOCUMENTS

| | | |
|---|---|---|
| 0120303 | 11/1974 | Japan . |
| 1222759 | 2/1971 | United Kingdom . |
| 2042429 | 9/1980 | United Kingdom . |

*Primary Examiner*—Michael W. Ball
*Assistant Examiner*—Nancy T. Krawczyk
*Attorney, Agent, or Firm*—Armstrong, Nikaido, Marmelstein, Kubovcik & Murray

[57] ABSTRACT

A tire for a motorcycle comprising a tread, sidewalls extending inwardly from both ends of the tread in a radial direction, bead portions positioned at the radially inward ends of the sidewalls, a toroidal reinforcement carcass composed of reinforcement cords which extend approximately parallel with each other in the radial direction of the tire and of which both end portions are turned up around bead cores, a breaker arranged on the radially outer side of the carcass, the breaker comprising reinforcement tire cords whose tensile strength is not less than 7 g/d and initial modulus is not less than 200 g/d laid at angles of 10° to 45° to the circumferential direction, and a band over the breaker and having a width greater than the breaker so as to axially extend past the outermost edges of the breaker and comprising parallel reinforcement cords laid at angles of 10° to 25° to the circumferential direction, the reinforcement cords of the band having a modulus less than the modulus of the reinforcement cords of the breaker.

The tire has resistance to wear, good grip, and stable high speed running properties.

10 Claims, 1 Drawing Sheet

MOTORCYCLE TIRE WITH NON-ZERO DEGREE BAND RADIALLY OUTWARD OF THE BREAKER

This application is a continuation of application Ser. No. 052,210 filed May 19, 1987 now abandoned, which is a continuation of application Ser. No. 720,240 filed Apr. 5, 1985 now abandoned.

BACKGROUND OF THE INVENTION

The present invention relates to a tire for a motorcycle and, in particular, to a radial tire for a motorcycle having improved durability when subjected to high speed running of the motorcycle.

With improved roads the speeds of vehicles are increasing and, therefore, motorcycle tires are required to possess improved characteristics required for high speed running.

Generally for the carcass such as toroidal reinforcement carcass of a tire such as motorcycle tire, a cross-ply structure is employed, that is, a structure in which there are two sheets of ply cords in the carcass intersecting each other and each laid at angles ranging from 30° to 60° with respect to the circumferential direction of the tire. The reason is that the requirements for motorcycle tires are radically different from those for four-wheel vehicles such as passenger cars, particularly, in respect of deflection during cornering. Furthermore it is necessary to have these characteristics to provide stable and consistent running while also withstanding the centrifugal force acting upon the motorcycle. The centrifugal force is resisted by a force (camber thrust) generated at the tire road contact zone when the motorcycle is tilted during cornering at a large degree of bank angle (measured in respect to a plane perpendicular to the road surface) acting horizontally inwards in the direction of the camber angle. Accordingly, the motorcycle tire must be transversely stiffened and this is done at present in the art by employing a carcass of the cross-ply type as described above so as to provide and sustain the abovesaid camber thrust, radial tire structures because of greatly inferior transverse stiffness being unusable. However, the cross-ply tire has drawbacks in that transverse vibration known as weave phenomenon of the motorcycle frame resulting from the transverse stiffness utilised occurs during high speed straight running and resistance to wear is low. As countermeasures to such problems as above, the angle at which the cords are laid with respect to the circumferential direction of the tire is made smaller or the number of plies in the carcass is increased to further increase the tire stiffness, but drawbacks attributable to the structure still cannot completely be removed as far as the cross-ply structure is employed.

Accordingly, the inventors examined the tire of basic radial structure which has not been successfully used for motorcycles and in particular the structural arrangement, and materials of the carcass reinforcing layers and breaker, and, as a result, have proposed a novel radial structure after discovering that camber thrust properties can be improved to a level as high as that of the cross-ply tire whilst maintaining the other advantages of the radial structure such as resistance to wear, good grip, and stable high speed running properties.

SUMMARY OF THE INVENTION

A tire for a motorcycle comprising a tread, sidewalls extending inwardly from the both ends of the tread in the radial direction, bead portions positioned at the radially inward ends of the sidewalls, a toroidal reinforcement carcass composed of reinforcement cords which extend approximately parallel with each other in the radial direction of the tire and of which the both end portions are turned up around bead cores, a breaker arranged on the radially outer side of the carcass, said breaker comprising reinforcement tire cords whose tensile strength is not less than 7 g/d and initial modulus is not less than 200 g/d laid at angles of 10° to 45° to the circumferential direction, and a band over the breaker and of longer width than the breaker and comprising parallel reinforcement cords laid at angles of 10° to 25° to the circumferential direction.

DETAILED DESCRIPTION

Figure 1:
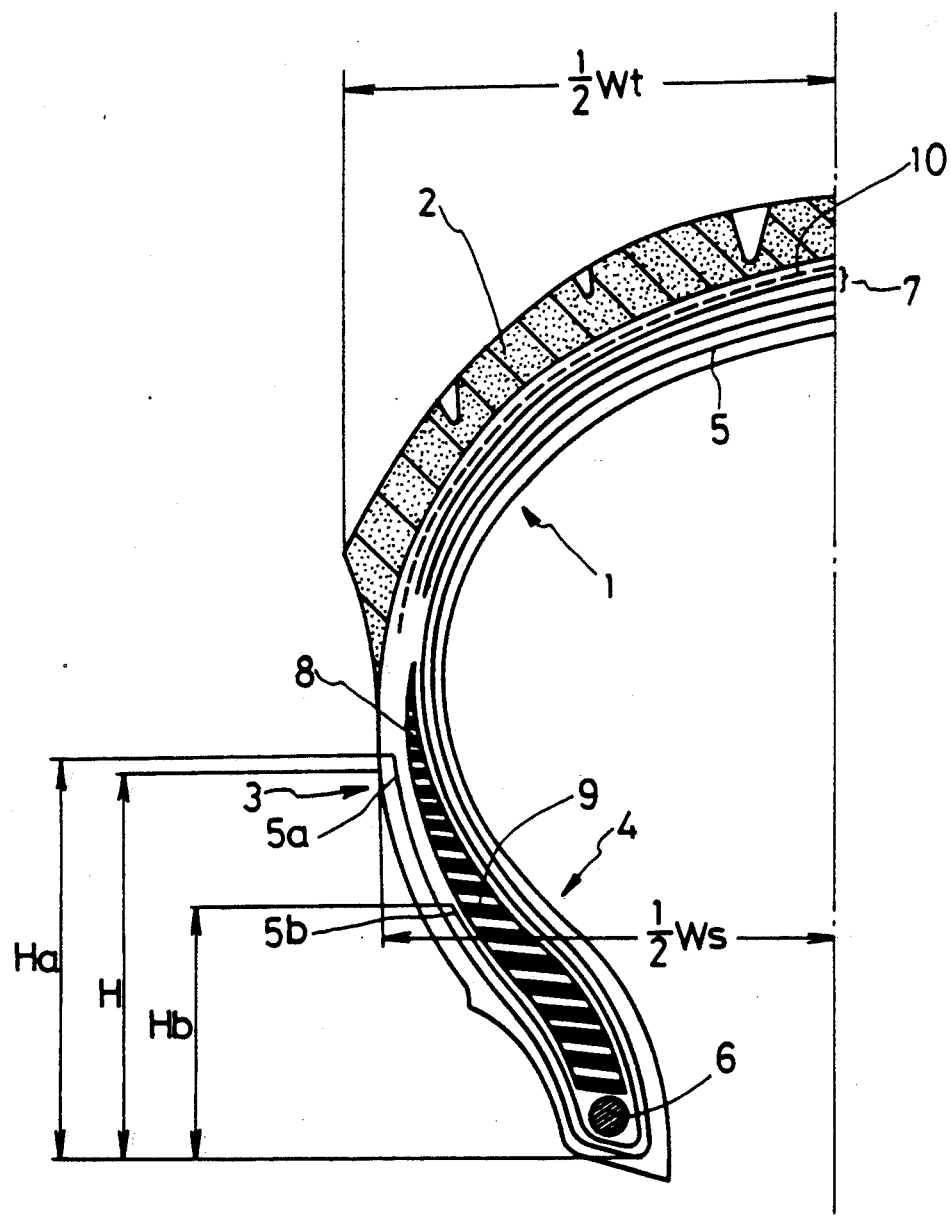
FIG. 1 is a cross sectional view of a left half of a tire for a motorcycle according to the present invention.

In the drawing, the motorcycle tire 1 comprises a tread such as a convex tread 2, sidewalls 3 extending radially inwardly from both ends of the tread and bead regions 4 positioned at the radially inward ends of the sidewalls. The tread 2 as stated is sharply convex and is reinforced by a carcass parallel to the arcuate configuration of the tread. The tread has a width $W_t$ which is larger than the maximum main carcass width $W_s$ measured at the widest point of the sidewalls. This allows the camber thrust generated when the tire is tilted to be taken by the tire even when steeply banked over.

The carcass 5 is composed of two plies and both edges of each are folded or wrapped from inside to outside around the bead core such as bead reinforcement core 6 and terminate above the bead core 6 in the upper bead region or in the sidewall 3. It is desirable that the end 5a of the folded edge portion of the outer ply edge lies outside the bead region and extends to a higher position than that of the folded edge 5b of the inner ply edge which lies inside the bead region and so that the abovesaid inner folded edge is covered. This mitigates stress concentrations at the edge portion. Further, to reinforce the sidewall, the ply turn up heights Hb and Ha between the bead base and the two folded ply edges, that is, the inner edge 5b and the outer edge 5a, respectively, are within the ranges of 55 to 65% and 70 to 150% of the height H from the bead base to the point of maximum carcass width as shown. Cords in the carcass 5 are arranged parallel or approximately parallel to the radial direction of the tire. To be approximately parallel means that cords are arranged transversely at 10° or less to the radial direction of the tire. If the cords were to be arranged at an angle larger than 10°, excellent characteristics of radial tire exhibited during high speed running would not be obtained. Textile fibers in cord form are used for the carcass fabric being organic materials such as nylon, polyester, rayon or aromatic polyamide. One or more plies may be used for the carcass, and, as an alternative to the structure in which the carcass is folded or wrapped from inside to the outside around the bead core 6 as shown in the drawing, a construction in which the carcass is folded from the outside to the inside may be used or a construction in which the former two are combined. The structure shown in the drawing is however the preferred optimum construction wherein the carcass is folded from the inside to the outside.

The breaker 7 is arranged to cover substantially the full width of the tread to increase the hoop effect. The cords of the breaker are arranged at an angle in the range of 10° to 45°, or more preferably from 20° to 35°, with respect to the circumferential direction of the tire. When the angle of the cord arrangement is smaller than this range the tread stiffness is increased and impact caused by small pebbles scattered on the road or by roughness of the road is felt excessively by the driver and stability as well as comfort during running of the motorcycle is hampered. Similarly too large an angle impedes operational stability at the time of high speed running. Usually, the breaker 7 is composed of two plies and the width of at least one of the plies is substantially equal to the width $W_t$ of the tread. Textile materials used for the cords of the breaker which is weftless may be the same as those used for the carcass reinforcing layer but preferably are aromatic polyamide material cords whose tensile strength is not less than 7 g/d and initial modulus is not less than 200 g/d, embedded in rubber whose 300% modulus ranges from 120 to 240 kg/cm².

According to the present invention, there is provided in addition a band 10 outside the breaker so as to cover at least both ends of the breaker. The cords of the breaker and those of the carcass intersect each other at a large angle and, therefore, the shearing strain is large at the interface of the breaker and the carcass, particularly, at positions near both edges of the breaker. The band 10 functions to resist this and also to prevent separation of the carcass ply from the breaker ply in the edge regions of the breaker arising from centrifugal force generated at high rotational speeds of the tire. The band 10 comprises ply material composed of cords of organic fibers such as nylon, polyester or rayon arranged at an angle ranging from 10° to 25° with respect to the circumferential direction of the tire and embedded in rubber at a density ranging from 30 to 60 cords/5 cm preferably from 40 to 50 cords/5 cm. The band 10 may be one or two plies or layers wrapped in the circumferential direction of the tire and in width within plus 10 mm of the width of the breaker. Further, according to the present invention, by providing upon the bead core 6 a triangular bead apex 9 made of hard rubber and extending from the bead core 6 into the sidewall the transverse stiffness of the tire is increased. The bead apex 9 decreases in thickness from the bead core 6 and the upper end of the bead apex 9 is preferably extended to a position near to the widest sectional width of the tire carcass. The hardness of the bead apex 9 is within the range of 65° to 95° Shore hardness.

An additional reinforcing ply (not shown) may be provided over the carcass ply composed of fiber cords and extending from one bead region on one side of the tire to the other bead region on the other side with both edges terminated short of the bead core 6 and not wrapped around the bead core. The additional reinforcing ply is laid so its cords intersect the carcass cords at a fixed angle to reinforce the sidewall and, to even further improve the cornering characteristics and it does this without impeding ride comfort by utilising a cord angle of 45° to 85° and more preferably 60° to 80° which increases the transverse resilience coefficient without increasing the vertical resilience coefficient. Each or both edges of the reinforcing ply is/are preferably positioned between the folded edges 5a and 5b of the carcass to lessen stress concentration in the bead region. Materials usable for the cords are organic fibers such as nylon, polyester, rayon, aromatic polyamide fibers but also steel wire may be used. Alternatively the additional reinforcing ply may be positioned between the outer surface of the bead apex 9 and the folded ends 5a and 5b as well as between the inner surface of the bead apex 9 and the carcass ply.

Due to the use of the special radial structure and the arrangement of the breaker according to the present invention, the suitability for high speed running that is, the speed usable without exceeding the critical speed for generation of standing wave, is increased and also the resistance to rolling is decreased. Moreover, because of the particular arrangement of the breaker and folded parts of the carcass, low transverse stiffness as an intrinsic drawback of the known radial tire is improved and camber thrust is increased to enable very much improved stable running, and the so-called "wobbling phenomenon" is effectively prevented, also separation of plies from each other at both edges of the breaker is prevented by the provision of the bands outside the breaker.

The present invention is more specifically described and explained by means of the following Examples. It is to be understood that the present invention is not limited to the Examples, and various changes and modifications may be made in the invention without departing from the spirit and scope thereof.

EXAMPLES 1 to 3 AND COMPARATIVE EXAMPLES 1 to 3

Motorcycle rear wheel tires were made of the size 130/180 to 18 with the structure as shown in FIG. 1 and with some modified structures. As controls, a cross-ply tire and a radial one of conventional structure and the same sizes and materials were used. Detailed specification of these tires are shown in Table 1, in which values of camber thrust are shown relative to the value of the cross-ply tire (Comparative Example 2) being set as 100. The higher the value, the better the tire. High speed performance testing was begun at 150 km/h and the speed was raised at intervals of 10 km/h and 10 minutes until by visual observation a speed at which standing wave was generated was reached.

The speed at which vehicle vibration was naturally generated during running on the highway road was evaluated by feel using a skilled test rider.

The durability test was performed by running the tire on a 60 inches dia. drum with the application of a load equivalent to 150% of the maximum value (405 kg) specified by the JATMA test procedure with the tire inflated to the maximum pressure (2.90 kg/cm²) specified by JATMA, and at a speed of 65 km/h.

For evaluation of performance in on-the-motorcycle testing, the motorcycle used was a YAMAHA XJ 1750, in which a cross-ply tire of 100/90V19 and the other tire under test as specified in Table 1 were used for the front wheel and the rear wheel, respectively.

TABLE 1

|  | Ex. 1 | Ex. 2 | Ex. 3 | Com. Ex. 1 | Com. Ex. 2 | Com. Ex. 3 |
|---|---|---|---|---|---|---|
| (1) Carcass | | | | | | |

TABLE 1-continued

|  | Ex. 1 | Ex. 2 | Ex. 3 | Com. Ex. 1 | Com. Ex. 2 | Com. Ex. 3 |
|---|---|---|---|---|---|---|
| Structure | Radial | Radial | Radial | Radial | Cross-ply | Radial |
| No. of plies | 2 | 2 | 2 | 2- | 4 | 2 |
| Cord arrangement angle (with respect to circumferential direction) | 88° | 88° | 88° | 88° | 34° | 88° |
| Material fiber | Nylon | Nylon | Nylon | Nylon | Nylon | Nylon |
| Denier | 2/1260d | 2/1260d | 2/1260d | 2/1260d | 2/1260d | 2/1260d |
| (2) Breaker | | | | | | |
| No. of plies (Width, mm) | 2(146/160) | 2(146/160) | 2(146/160) | 2(146/160) | — | 2 |
| Material fiber | Aromatic plyamide | Aromatic polyamide | Aromatic polyamide | Aromatic polyamide | — | Aromatic polyamide |
| Denier | 2/1500d | 2/1500d | 2/1500d | 2/1500d | — | 2/1500d |
| Cord arrangement angle (with respect to circumferential direction) | 17° | 17° | 17° | 17° | — | 22° |
| (3) Band Note 1) | | | | | | |
| No. of plies (Width, mm) | 1 (170) | 1 (170) | 1 (170) | — | — | — |
| Material fiber | Nylon | Nylon | Nylon | — | — | — |
| Denier | 2/840 | 2/840 | 2/840 | | | |
| Cord arrangement angle (with respect to circumferential direction) | 17° | 17° | 17° | | | |
| (4) Bead apex | | | | | | |
| Hardness by JIS | 95° | 95° | — | 85° | — | — |
| Height of upper end (from bead base part) | 48 mm | 48 mm | | 48 mm | | |
| Drum test Note 2) | | | | | | |
| Camber thrust | 96 | 91 | 86 | 82 | 100 | 65 |
| Speed at which standing wave is generated | 250 km/h | 245 km/h | 230 km/h | 220 km/h | 160 km/h | 210 km/h |
| On-the-motorcycle test | | | | | | |
| Speed at which vibration is naturally generated | No vibration up to 210 km/h | No vibration up to 210 km/h | No vibration up to 210 km/h | No vibration up to 190 km/h | 170 km/h | No Vibration up to 200 km/h |
| Convergence of tire when subjected to extraneous disturbance | Yes | Yes | Yes | Yes | Yes | Poor convergence, no dispersion |
| Durability | No abnormality up to 20,000 km mileage | The same to the left | The same to the left | Breaker loose 3-10 mm at 13,000 km mileage | — | — |

Note 1) Band is composed of cords at a density of 49 lines/5 cm wound in one layer in the circumferential direction of the tire.
Note 2) Drum test condition: 60 inches dia drum, load on tire ... 200 kg, internal load ... 2.25 kg/cm$^2$

What we claim is:

1. A motor cycle tire comprising:
   a tread;
   sidewalls extending radially inwardly from each tread edge to bead regions;
   a bead reinforcement core in each bead region; and
   a reinforcement carcass extending through said tread, said sidewalls and wrapped at each of its ends around said bead reinforcement cores,
   said carcass comprising parallel reinforcement cords of organic fiber selected from the group consisting of nylon, polyester, rayon and aromatic polyamide fiber laid in a radial direction of the tire,
   said tread being reinforced by a breaker disposed radially outward of the carcass and an additional band disposed radially outward of said breaker, said breaker comprising high modulus reinforcement tire cords composed of aromatic polyamide whose tensile strength is not less than 7 grams per denier and whose initial modulus is not less than 200 grams per denier, said cords of said breaker being laid at an angle ranging from 10° to 45° relative to a circumferential direction of said tire, said additional band disposed radially outward of said breaker extending at least beyond both ends of said breaker, said additional band comprising parallel reinforcement cords laid at an angle ranging from 10° to 25° relative to said circumferential direction of said tire and being selected from ply materials from the group consisting of nylon, polyester and rayon,
   said tread having a width larger than the maximum width of said carcass measured at a widest point of said sidewalls.

2. The tire according to claim 1 wherein the breaker reinforcement cords are embedded in rubber having a 300% modulus in the range of 120 to 240 kg/cm².

3. The tire according to claim 1 wherein the carcass reinforcement cords are aromatic polyamide material.

4. The tire according to claim 1 wherein the cords of the breaker are laid at angles of 20° to 35° to the circumferential direction.

5. The tire according to claim 1 wherein the cords of the band are embedded in rubber at a density of 30 to 60 cords per 5 cm.

6. The tire according to claim 1 wherein the band comprises two layers wrapped from a single sheet twice around the tire circumference.

7. The tire according to claim 1 wherein each bead region has mounted upon its bead core and extending radially outwards thereof a triangular section bead apex of hard rubber material and extending substantially to the height of the widest part of the tire carcass.

8. The tire according to claim 1, including an additional reinforcing ply over the carcass ply and under the breaker laid with its cord angle from 45° to 85° to the radial direction and extending around the carcass to points in the bead regions radially outside the bead cores without wrapping around the bead cores.

9. A tire for a motorcycle according to claim 1, wherein said reinforcement tire cords of said breaker and said reinforcement cords of said carcass intersect each other at an angle so that a large shearing strain is at the interface of said breaker and said carcass at positions near both edges of said breaker.

10. A tire for a motorcycle according to claim 1, wherein said additional band over said breaker is wrapped in the circumferential direction of said tire and in width within ±10 mm of the width of the breaker.

* * * * *